Patented Sept. 27, 1938

2,131,712

UNITED STATES PATENT OFFICE 2,131,712

ORGANIC DYESTUFFS AND PROCESS FOR PRODUCING THEM

Conrad Schoeller, Gustav Schwen, and Georg Kraemer, Ludwigshafen-on-the-Rhine, Germany, assignors to General Aniline Works, Inc., New York, N. Y., a corporation of Delaware No Drawing. Application March 1, 1934, Serial No. 713,604. In Germany March 4, 1933

16 Claims. (Cl. 260—86)

The present invention relates to organic dyestuffs and a process of producing same.

We have found that very valuable organic dyestuffs are obtained by causing at any stage of the production of a dyestuff aliphatic oxygen-containing compounds containing at least two carbon atoms in the molecule and capable of condensing with the formation of ether-oxygen bridges and hydroxy groups, to act on organic dyestuffs or on starting materials suitable in the production of organic dyestuffs and finally forming part of the dyestuff molecule or on dyestuff components which finally form part of the molecule of the dyestuff, which compounds contain at least one reactive hydrogen atom in the molecule, in such amounts that the reaction product contains per molecule at least one radicle of at least 4 carbon atoms containing at least one ether-oxygen bridge and at least one free hydroxyl group.

It is often advantageous to introduce such radicles of the kind defined as contain at least 8 carbon atoms. Mixtures of dyestuffs or of components may also be used. If radicles of the kind defined above are introduced into uniform dyestuffs or dyestuff components uniform products or mixtures may be formed.

Suitable aliphatic oxygen-containing compounds containing at least two carbon atoms in the molecule and capable of condensing with the formation of ether-oxygen bridges (i. e. oxygen atoms connecting with one another two alkyl or alkylene or like unsubstituted or substituted radicles) are for example the alkylene oxides or substances yielding the same, preferably those of low molecular weight; ethylene oxide is used with special advantage, if desired in combination with propylene oxide. As examples of compounds yielding or reacting like alkylene oxides may be mentioned ethylene glycol, propylene glycol, glycerine, glycol chlorhydrin, epichlorhydrin, 1,2- and 1,3-dichlorhydrin. The introduction of the organic radicles concerned may also be effected directly by condensing the initial materials with tri- or tetra-ethylene glycol or polymerized glycerine or halogen compounds obtainable therefrom. It is also possible to react organic compounds containing a readily exchangeable halogen atom and a readily reactive hydrogen atom, as for example monochloracetic acid or ethylene glycol chlorhydrin, with alkylene oxides or polymerized glycols, the resulting products being further reacted with dyestuffs or components thereof, such as di- or poly-amines, as for example meta-phenylenediamine or benzidine.

As initial materials for the process according to this invention may be mentioned for example aminoanthraquinones, such as alpha- or beta-aminoanthraquinone, or 1,4- or 1,5-diaminoanthraquinone, 1,4- or 1,5-ditoluidoanthraquinone, and acylation or sulphonation products of these, also dihydroxy- or trihydroxy-anthraquinones, mono- or dihydroxy- or mono- or di-amino-benzanthrones, or hydroxy, or amino-dibenzanthrones, or other vat dyestuffs containing hydroxy, carboxyl or amino groups, as for example those of the indigo or thioindigo series, aminoazobenzene, or azo dyestuffs or triphenyl-methane dyestuffs which contain hydroxy, carboxyl, amino or imino groups. Also the components usual for the preparation of triphenyl-methane dyestuffs and the coupling components used for the preparation of azo dyestuffs, as for example amines, phenols, naphthols or their substitution products, such as para-toluidine, para-xylidine, ortho-anisidine, meta-phenylenediamine, meta-toluylenediamine and alpha-naphthylamine, also para-aminophenol, amino-naphthol sulphonic acids and salicylic acid may be employed. Products obtainable by acting with ethylene oxide on the said compounds may be used for preparing dyestuffs by coupling with diazonium compounds which may also contain polyhydroxyethyl groups and /or carboxylic and/or sulphonic acid groups. Coupling components treated with agents introducing ethenoxy groups may be coupled with any diazo compounds which on their part may also be treated with agents introducing such groups and which may contain sulphonic acid groups, whereby dyestuffs of most varied kinds are obtained. The amines employed for the preparation of the diazo compounds may be condensed with ethylene oxide or the like before their diazotization, or polymerized glycol ether or polymerized glycerine radicles may be introduced. Care should be taken that a diazotizable amino group remains. If necessary, the latter may be protected by reaction with an organic compound which is readily split off again. For the last-mentioned method of working, meta-phenylenediamine, benzidine, tolidine, dianisidine, di-aminoazobenzene and anthranilic acid may be mentioned for example. In some cases the initial materials may be reactive aromatic nitro compounds which are treated with ethylene oxide or the like and then reduced to the corresponding amines which are diazotized and further worked up into azo dyestuffs.

In many cases, as for example in reactions with ethylene oxide, the process according to the present invention may be carried out at ordinary temperature; the employment of elevated temperatures is frequently to be recommended; for example temperatures of from 60 to 180° C. may be used. Ethylene oxide may be employed in the liquid or in the gaseous state. The employment of increased pressure is also often preferable. The reaction is promoted by the employment of neutral, acid or alkaline catalysts, as for example of surface-active compounds, such as bleaching earths, of acids, as for example small amounts of mineral acids, or of alkaline substances, as for example alkali metal hydroxides, alkali metal alcoholates, ammonia, amines or salts such as sodium acetate and sodium chloride. Even amounts of between 0.1 to 1 per cent of catalyst are operative, but higher proportions may also be employed. The working conditions depend on the nature of the reagents employed.

Usually in the products obtainable according to the present invention the hydroxy groups are attached to the end of the carbon chain of the radicles introduced. The hydroxy groups may, if desired, be substituted by radicles of phosphoric or sulphuric acid, for example by means of chlorsulphonic acid, whereby esters of the said mineral acids are formed.

The dyestuffs obtainable according to this invention are distinguished, contrasted with the corresponding dyestuffs containing no radicles of the said kind in the molecule, by a specially ready capacity for being dispersed or dissolved in water. They may also be employed for example for dyeing in water having a high degree of hardness without undesirable deposits being formed. In cases when the said dyestuffs have only a slight affinity for the fibres, they may frequently be employed nevertheless for the production of deep dyeings or prints if the dyeing be effected at higher temperatures, for example at boiling temperature, or with the addition of acids or salts, such as Glauber's salt, formic acid, acetic acid and the like, or if the material be pretreated with substances which yield difficultly soluble or water-insoluble compounds or precipitates with the dyestuffs or dyestuff components concerned. Substances of the said kind for pretreating are for example tannin or other compounds having phenolic hydroxyl groups, tanning substances, sulphurized phenols and their sodium salts. In the said case, the dyestuff is directly produced on the fibre from its water soluble components. By aftertreating the dyed textiles or the like with tannin, reduction products of a phosphotungstomolybdic acid or metal salts, the fastness to water, washing or light of the dyeings may in many cases be improved. The textiles may also be dyed directly with dyestuffs of the kind in question which have previously been treated with metal salts. Fibrous materials which with the usual dyestuffs are usually dyed with different depths of color, as for example cotton, viscose silk, natural silk and the like, especially mixed fabrics of the said materials, are frequently dyed very uniformly with the dyestuffs obtainable according to this invention. The treatment with ethylene oxide or the like leads to dyestuffs which are absorbed on the fibres, preferably the vegetable fibres, more slowly and therefore in many cases yield dyeings of very good levelness and excellent penetration. This effect increases with increasing amounts of alkylene oxide or the like reacting upon the dyestuffs. The said dyestuffs are also suitable for dyeing fats, oils, waxes, soaps, organic solvents and cellulose ester of ether varnishes.

In many cases it is preferable to employ the dyestuffs together with known assistants for the dye industry, as for example Glauber's salt, acetic acid, sulphite waste liquor, soaps, Turkey red oils, sulphuric esters of alcohols of high molecular weight, condensation products of fatty acids and the like with aminoalkyl- or hydroxyalkyl-sulphonic acids and reaction products of ethylene oxide on high molecular alcohols. Some of the dyestuffs may be used either alone or together with suitable binding agents for applying trademarks, capable of being washed off, to textiles, for printing paper and for coloring sizes.

The following examples will further illustrate the nature of this invention but the invention is not restricted to these examples. The parts are by weight.

*Example 1*

A mixture of 20 parts of 1,4-diaminoanthraquinone, 1 part of sodium chloride, 70 parts of benzene and 30 parts of ethylene oxide is heated in an autoclave for 15 hours at from 120° to 130° C. while stirring. After distilling off the benzene, the resulting product is boiled up with water and the aqueous solution evaporated, the product being dried in vacuo. 40 parts of a blue-grey dyestuff of a viscous nature are obtained which dyestuff is readily soluble in water, alcohol, benzene, pyridine and glacial acetic acid.

A mercerized cotton yarn is mordanted in a bath containing 5 grams of tannin per litre of water for about 12 hours; then the yarn is centrifuged and dyed in a bath containing 3 grams of the dyestuff described in the preceding paragraph per litre for 1 hour at 40° C. A dark grey cotton is obtained. By after-treatment with copper chloride and acetic acid, the dyeing acquires good fastness to washing.

1 part of the dyestuff is dissolved in 9 parts of linseed oil. The colored linseed oil may be employed as such or in combination with siccatives for sizing artificial silk, the coloration serving to distinguish the sized warp. The artificial silk is scarcely colored itself.

*Example 2*

1 molecular proportion of meta-phenylenediamine is treated with 7 molecular proportions of ethylene oxide in the presence of small amounts of sodium alcoholate at about 100° C. in an autoclave until the whole of the ethylene oxide has been absorbed. A viscous oil readily soluble in water is formed.

Viscose artificial silk is mordanted in a bath containing 3 grams of tannin per litre of bath, primed in a bath containing 8 grams of the said product for half an hour at room temperature and then centrifuged. After drying, the artificial silk is treated in a bath containing per litre of water 10 grams of Fast Blue Salt B (Colour Index No. 499) and 1 gram of a product formed by the action of about 20 molecular proportions of ethylene oxide on 1 molecular proportion of oleyl alcohol. The viscose artificial silk is dyed deep red-violet shades; the dyeing has a good fastness to rubbing. Instead of producing the dyestuff on the fibre the dyestuff may also be formed from the components in the bath, the textile material being dyed subsequently. If the dyed goods be subjected to a treatment with a bath containing 2 grams of tannin, 25 grams of common salt and 10 cubic centimetres of 30 per cent acetic acid per litre at room temperature, a dyeing of very good fastness to water is obtained.

Example 3

A thoroughly stirred mixture of 20 parts of aminoazobenzene and 1 part of sodium chloride is heated for 15 hours in an autoclave with 60 parts of benzene and 30 parts of ethylene oxide while stirring at from 120° to 130° C. After distilling off the benzene, the product is boiled in water, the resulting aqueous solution evaporated and the product dried in vacuo. The dyestuff obtained is a viscous olive-brown mass which is readily soluble in water, alcohol, benzene, glacial acetic acid and pyridine.

Viscose artificial silk or natural silk mordanted with tannin is treated at 30° C. with a bath containing 6 grams of the said product per litre of water. An olive-green artificial silk or silk is thus obtained. Wool is dyed yellow shades by the same treatment.

9 parts of olein are mixed with 1 part of a product which is obtainable by treating 1 molecular proportion of amino-azobenzene with 6 molecular proportions of ethylene oxide while adding 0.5 per cent of caustic soda solution of 40° Bé. strength and heating at 120° C. in a closed vessel. The olein is colored olive-green.

Example 4

1 molecular proportion of 1,4-diaminoanthraquinone is treated at about 120° C. with 5 molecular proportions of ethylene oxide in the presence of 1 per cent of sodium chloride. The blue colored product thus obtained may be readily dispersed in water.

Acetate silk is treated for an hour at 70° C. in a bath containing 5 per cent of the said product, preferably with an addition of from 1 to 2 grams of soap or from 1 to 2 grams of the reaction product of 20 molecular proportions of ethylene oxide and 1 molecular proportion of oleyl alcohol per litre of the bath. A bluish violet dyeing is obtained with a very good fastness to rubbing.

Example 5

7 molecular proportions of ethylene oxide are allowed to act on 1 molecular proportion of meta-phenylenediamine with an addition of 0.5 per cent of caustic soda solution of 40° Bé. strength until the ethylene oxide is practically completely absorbed. By coupling the reaction product with Fast Blue Salt B (Colour Index No. 499) a red-violet dyestuff readily soluble in water is obtained which is of resinous nature and which dissolves for example in ethyl alcohol and pyridine.

If tanned sheep leather be treated in a shaking apparatus with an aqueous solution of the dyestuff for 20 minutes at room temperature, rinsed and dried, a deep blue-black leather is obtained which has a good gloss after the usual mechanical working. The tannin contained in the leather acts simultaneously as a mordant.

In a similar manner such water-soluble dyestuffs may be applied to the fibre as are obtained by condensing 1 molecular proportion of para-aminophenol with 1 molecular proportion of monochloracetic acid and from 6 to 8 molecular proportions of ethylene oxide and coupling the condensation product obtained with diazo compounds of aniline or its derivatives, for example nitraniline. By employing in the process described in paragraph 1 of the present example diazotized 2,5,7-aminonaphthol-sulphonic acid instead of Fast Blue Salt B and by working up in the usual manner a very readily soluble powdery dyestuff is obtained which for example dyes chrome-tanned leather deep dark red shades.

Example 6

A mixture of 25 parts of 2-aminoanthraquinone, 1 part of dry sodium chloride, 60 parts of benzene and 30 parts of ethylene oxide is heated at from 120° to 130° C. for 15 hours while stirring in an autoclave. The benzene is distilled off and the mass boiled with water. The aqueous solution containing the dyestuff is then evaporated and the product dried in vacuo at 100° C. 45 parts of a red-brown viscous product which is readily soluble in water, benzene, alcohol, cyclohexanone and pyridine are obtained.

9 parts of a montanic acid glycol ester or beeswax are fused with 1 part of the said dyestuff; after cooling a brick-red colored wax is obtained which is suitable for example for the preparation of colored wax candles.

Example 7

7 molecular proportions of gaseous ethylene oxide are allowed to act on 1 molecular proportion of meta-phenylenediamine at atmospheric pressure and at 120° C. in the manner described in Example 2. A product readily soluble in water is obtained.

Natural silk and a viscose artificial silk which has been mordanted with tannin are treated for half an hour at room temperature in a bath containing 5 grams of the said product per litre, centrifuged and dyed in a bath containing 10 grams of Fast Red Salt GL (Schultz, Farbstofftabellen, 1931, No. 86) per litre; red-brown shades of practically the same depth are obtained. The dyeings are very fast to water.

If, instead of the said reaction product of ethylene oxide on meta-phenylenediamine, a product be employed which is formed by the action of 10 molecular proportions of ethylene oxide on 1 molecular proportion of ortho-anisidine or para-xylidine, from golden yellow to orange dyeings are obtained; by employing the reaction product of about 12 molecular proportions of ethylene oxide on 1 molecular proportion of cresidine, brown-black shades are obtained with the diazotized monoazo dyestuff obtainable from diazotized para-nitraniline and amino-hydroquinonedimethyl ether.

A bath containing a water-soluble azo dyestuff prepared while employing the said condensation product of meta-phenylenediamine and ethylene oxide is used for the treatment of a paper mass previously treated with tannin and composed of about 2 parts of wood pulp and 1 part of sulphite cellulose and containing slight additions of resin soap and aluminium sulphate, the treatment being carried on for half an hour at room temperature. After filtering off the water by suction and drying, a deep red colored material is obtained.

Example 8

Oak or beech wood is immersed for several hours in an aqueous solution containing 5 grams of the dyestuff described in Example 1 per litre; a grey colored wood is obtained. The dyestuff described in Example 6 may be used in the same way, a red colored wood being obtained. The tannin contained in the wood acts simultaneously as a mordant.

*Example 9*

Viscose artificial silk rope ware is primed with a solution containing per litre 8 grams of a condensation product obtained by reacting a polyglycerine treated with gaseous hydrochloric acid (for example at about 100° C.) with meta-phenylene-diamine, for example at about 150° C. After centrifuging the artificial silk is handled at about 15° to 20° C. in a bath containing per litre 10 grams of Fast Blue Salt B (Colour Index No. 499), centrifuged and dried. Dyeings of chestnut brown shades having very good fastness to rubbing are obtained.

If the reaction product from meta-phenylene-diamine and polyglycerine treated with gaseous hydrochloric acid is coupled with diazotized 2,5,7-aminonaphtholsulphonic acid, a dyestuff readily soluble in water is obtained. By dyeing viscose artificial silk with 2 per cent of the sodium salt of the said dyestuff during 1 hour at 80° C. in the presence of 20 per cent of Glauber's salt, a very level dyeing of red-violet shade is obtained.

What we claim is:

1. In a process of producing organic dyestuffs the step which comprises causing an aliphatic oxygen-containing compound containing at least two carbon atoms in its molecule and capable of condensing with the formation of ether oxygen bridges and hydroxy-groups, at any stage of the production of a dyestuff, to act on an organic compound selected from the group consisting of organic dyestuffs, starting materials and dyestuff components, the two latter of which finally form part of a dyestuff molecule containing at least one reactive hydrogen atom in the molecule, in such amounts that the reaction product contains per molecule at least one radicle with at least 4 carbon atoms containing at least one ether-oxygen bridge and at least one free hydroxy group.

2. The process of producing organic dyestuffs which comprises causing an aliphatic oxygen-containing compound containing at least two carbon atoms in its molecule and capable of condensing with the formation of ether-oxygen bridges and hydroxy-groups, to act on an organic dyestuff containing at least one reactive hydrogen atom in its molecule, in such amounts that the reaction product contains per molecule at least one radicle with at least 4 carbon atoms containing at least one ether-oxygen bridge and at least one free hydroxy group.

3. The process of producing organic dyestuffs which comprises causing an aliphatic oxygen-containing compound containing at least two carbon atoms in its molecule and capable of condensing with the formation of ether-oxygen bridges and hydroxy-groups, to act on an organic dyestuff component containing at least one reactive hydrogen atom in its molecule, in such amounts that the reaction product contains per molecule at least one radicle with at least 4 carbon atoms containing at least one ether-oxygen bridge and at least one free hydroxy group, and converting the said reaction product into a dyestuff.

4. In a process of producing organic dyestuffs the step which comprises causing an alkylene oxide, at any stage of the production of a dyestuff to act on an organic compound selected from the group consisting of organic dyestuffs, starting materials and dyestuff components, the two latter of which finally form part of a dyestuff molecule containing at least one reactive hydrogen atom in its molecule, in such amounts that the reaction product contains per molecule at least one radicle with at least 4 carbon atoms containing at least one ether-oxygen bridge and at least one free hydroxy group.

5. In a process of producing organic dyestuffs the step which comprises causing ethylene oxide, at any stage of the production of a dyestuff to act on an organic compound selected from the group consisting of organic dyestuffs, starting materials and dyestuff components, the two latter of which finally form part of a dyestuff molecule containing at least one reactive hydrogen atom in its molecule, in such amounts that the reaction product contains per molecule at least one radicle with at least 4 carbon atoms containing at least one ether-oxygen bridge and at least one free hydroxy group.

6. In a process of producing organic dyestuffs the step which comprises causing at least two molecular proportions of ethylene oxide to react with a compound selected from the group consisting of organic dyestuffs, starting materials and dyestuff components, the two latter of which finally form part of a dyestuff molecule at any stage of the production of a dyestuff to form a radicle containing at least one ether-oxygen bridge and at least one hydroxy group.

7. The process of producing organic dyestuffs which comprises causing at least two molecular proportions of ethylene oxide to react with a dyestuff to form a radicle containing at least one ether-oxygen bridge and at least one hydroxy group.

8. The process of producing organic dyestuffs which comprises causing at least two molecular proportions of ethylene oxide to react with a dyestuff component and converting the reaction product into a dyestuff to form a radicle containing at least one ether-oxygen bridge and at least one hydroxy group.

9. Organic dyestuffs containing per molecule at least one aliphatic radicle with at least 4 carbon atoms, which contains at least one ether-oxygen bridge, and at least one aliphatically bound free hydroxy group.

10. Azo dyestuffs containing per molecule at least one aliphatic radicle with at least 4 carbon atoms, which contains at least one ether-oxygen bridge, and at least one aliphatically bound free hydroxy group.

11. Organic dyestuffs containing at least once the grouping $-(C_2H_4OC_2H_4O)_n-H$, in which $n$ represents a whole number.

12. Azo dyestuffs containing at least once the grouping $-(C_2H_4OC_2H_4O)_n-H$, in which $n$ represents a whole number.

13. The process of producing organic dyestuffs which comprises causing an alkylene oxide to react on an organic dyestuff containing at least one reactive hydrogen atom in its molecule, in such amounts that the reaction product contains per molecule at least one radicle with at least 4 carbon atoms containing at least one ether-oxygen bridge and at least one free hydroxy group.

14. The process of producing organic dyestuffs which comprises causing ethylene oxide to react on an organic dyestuff containing at least one reactive hydrogen atom in its molecule, in such amounts that the reaction product contains per molecule at least one radicle with at least 4 carbon atoms containing at least one ether-oxygen bridge and at least one free hydroxy group.

15. The process of producing organic dyestuffs which comprises causing an alkylene oxide to react on an organic dyestuff component containing at least one reactive hydrogen atom in its molecule, in such amounts that the reaction product contains per molecule at least one radicle with at least 4 carbon atoms containing at least one ether-oxygen bridge and at least one free hydroxy group, and converting the said reaction product into a dyestuff.

16. The process of producing organic dyestuffs which comprises causing ethylene oxide to react on an organic dyestuff component containing at least one reactive hydrogen atom in its molecule, in such amounts that the reaction product contains per molecule at least one radicle with at least 4 carbon atoms containing at least one ether-oxygen bridge and at least one free hydroxy group, and converting the said reaction product into a dyestuff.

CONRAD SCHOELLER.
GUSTAV SCHWEN.
GEORG KRAEMER.